United States Patent
Grewal (10) Patent No.: US 8,490,947 B2
(45) Date of Patent: *Jul. 23, 2013

(54) PRESETTABLE GAS VALVE WITH RETAINER

(75) Inventor: Harsharan Grewal, Diamond Bar, CA (US)

(73) Assignee: Joe Leighton & Associates, Inc., Corona, CA (US)

(*) Notice: Subject to any disclaimer, the term of this patent is extended or adjusted under 35 U.S.C. 154(b) by 49 days.

This patent is subject to a terminal disclaimer.

(21) Appl. No.: 13/072,484

(22) Filed: Mar. 25, 2011

(65) Prior Publication Data

US 2011/0175002 A1    Jul. 21, 2011

Related U.S. Application Data

(63) Continuation-in-part of application No. 12/571,957, filed on Oct. 1, 2009.

(51) Int. Cl.
*F16K 51/00* (2006.01)

(52) U.S. Cl.
USPC ........... 251/285; 251/112; 251/264; 251/101; 137/15.18; 126/614; 126/500

(58) Field of Classification Search
USPC ....... 251/285, 284, 264, 101, 112; 137/15.18; 126/614, 500, 512
See application file for complete search history.

(56) References Cited

U.S. PATENT DOCUMENTS

| | | | | |
|---|---|---|---|---|
| 1,137,343 A * | 4/1915 | McGivern | ..................... | 251/218 |
| 1,689,236 A * | 10/1928 | Fraser, Jr. | ..................... | 116/277 |
| 2,051,953 A | 8/1936 | Leathers | | |
| 2,054,978 A | 9/1936 | Hoelscher | | |
| 2,156,984 A | 10/1937 | Haupt | | |
| 3,134,569 A * | 5/1964 | Sidenbender et al. | ........ | 251/214 |
| 3,253,612 A * | 5/1966 | Curatola et al. | .............. | 137/553 |
| 3,404,866 A * | 10/1968 | Fleer | .............................. | 251/284 |
| 3,565,089 A * | 2/1971 | Thompson | .................. | 137/68.16 |
| 3,712,587 A * | 1/1973 | Specht | .......................... | 251/285 |
| 3,877,327 A | 4/1975 | Erm | | |
| 4,376,397 A | 3/1983 | Newby et al. | | |
| 4,542,666 A | 9/1985 | White | | |
| 4,905,548 A | 3/1990 | Colace et al. | | |
| 5,048,792 A * | 9/1991 | Fischer | ......................... | 251/297 |
| 5,138,911 A | 8/1992 | Lan | | |
| 5,427,140 A * | 6/1995 | Bosanquet | ..................... | 137/554 |
| 5,813,296 A | 9/1998 | Hoff et al. | | |

(Continued)

*Primary Examiner* — John K Fristoe, Jr.
*Assistant Examiner* — Minh Le
(74) *Attorney, Agent, or Firm* — Stetina Brunda Garred & Brucker (57) ABSTRACT

A presettable gas valve is disclosed herein. The gas valve may have a maximum gas flow that can be adjusted to the particular requirements of the fireplace in which the gas valve is used. By way of example and not limitation, for real biomass/fuel burning fireplaces, the gas valve may be opened to its maximum level with a quarter turn of a handle. In contrast, for fake fireplaces, which require more gas flow compared to real fireplaces, the gas valve may be opened to its maximum level with a half turn of the handle. The maximum gas flow through the gas valve may be set during installation such that the user does not need to manually determine the appropriate amount of gas during use.

14 Claims, 4 Drawing Sheets

U.S. PATENT DOCUMENTS

| | | | |
|---|---|---|---|
| 5,950,982 A * | 9/1999 | Williams | 251/90 |
| 6,019,129 A * | 2/2000 | Taha | 137/553 |
| 6,131,604 A | 10/2000 | Harriss | |
| 6,176,160 B1 | 1/2001 | Ruhlander et al. | |
| 6,269,717 B1 | 8/2001 | Bollinger | |
| 6,612,220 B2 * | 9/2003 | Niessen | 92/13.5 |
| 6,783,112 B2 * | 8/2004 | Kerger et al. | 251/285 |
| 7,055,412 B2 | 6/2006 | Leighton | |
| 7,174,913 B2 * | 2/2007 | Albizuri | 137/556 |
| 2004/0041116 A1 * | 3/2004 | Kerger et al. | 251/285 |
| 2008/0197310 A1 * | 8/2008 | Gethmann | 251/205 |
| 2009/0283708 A1 * | 11/2009 | Wingett et al. | 251/285 |
| 2010/0012876 A1 * | 1/2010 | Burger | 251/264 |
| 2011/0079744 A1 * | 4/2011 | Grewal | 251/333 |

* cited by examiner

FIG. 6

PRESETTABLE GAS VALVE WITH RETAINER

CROSS-REFERENCE TO RELATED APPLICATIONS

This is a continuation in part application of U.S. patent application Ser. No. 12/571,957, filed on Oct. 1, 2009, the entire contents of which is expressly incorporated herein by reference.

STATEMENT RE: FEDERALLY SPONSORED RESEARCH/DEVELOPMENT

Not Applicable

BACKGROUND

The present invention relates to a gas valve wherein its maximum gas flow can be adjusted during installation.

Modern fireplaces are operated with the assistance of supplemental fire. In particular, a combustible gas is routed to the fireplace which can be ignited to assist in the initial ignition of a fuel source of a real fireplace or continued illumination of a fake fireplace. Real fireplaces that burn biomass may typically require assistance with the initial ignition of the biomass. To this extent, the combustible gas is ignited to initiate the burning of the biomass in the real fireplace. For fake fireplaces, the combustible gas is ignited and left on to simulate the burning of real biomass (e.g., wood).

The amount of gas flow needed for the real fireplace and the fake fireplace is different. In real fireplaces, less combustible gas is needed compared to fake fireplaces. To adjust the amount of gas flow through the fireplace, the user manually adjusts a gas valve that controls the gas flow of the combustible gas to the fireplace. If additional gas flow or fire/heat is desired or needed, then the gas valve is manually opened. However, if less gas flow is needed, then the user will manually close the gas valve.

Unfortunately, home owners, operators and users may be unaware of the appropriate amount of gas flow required for their particular fireplace (e.g., fake or real fireplace). As a result, the user or operator may flow too much gas into the fireplace thereby inefficiently operating the fireplace.

For the foregoing reasons, there is a need in the art for an improved gas valve for fireplaces.

BRIEF SUMMARY

The present invention addresses the needs discussed above, discussed below and those that are known in the art.

A gas valve that can be preset to regulate gas supplied to a real fireplace or a fake fireplace is disclosed. The gas valve can be opened to allow gas to flow through the gas valve by turning a valve shaft with a handle. An installer can limit the maximum rotation of the valve shaft to limit the maximum gas flow that can flow through the gas valve. Depending on the type of fireplace the gas valve is installed on, the gas valve can be preset such that the maximum gas flow through the gas valve provides the appropriate amount of gas to the fireplace. More particularly, the gas valve may have a valve body with an adjustable first adapter which defines a limit surface. The valve shaft may have a pin which protrudes outwardly. When the valve shaft is rotated, the pin may contact the limit surface of the first adapter. Since the first adapter may be fixed to the valve body of the gas valve, the pin and valve shaft can no longer rotate when the pin contacts the limit surface. This sets a maximum opening of the gas valve and the maximum gas flow through the gas valve. To increase or decrease the amount of gas flow when the valve shaft has been rotated to its maximum extent, the first adapter may be rotated in the appropriate direction to block rotation of the valve shaft and pin either earlier or later to respectively decrease or increase the maximum gas flow that can flow through the gas valve.

More particularly, a gas valve for regulating gas supplied to a fireplace is disclosed. The valve may comprise a valve body, a valve member, a valve shaft, a pin and a first adapter. The valve body may have an input port connectable to a gas source, an output port for supplying combustible gas to the fireplace, a stem portion with an internal thread, and a seat defining a gas passageway disposed between the input port and the output port so that the gas flowing into the valve from the input port flows out of the valve through the output port by way of the gas passageway. The valve member may be selectively traversable closer to or further away from the seat for regulating gas flowing through the gas passageway. The valve shaft may be attached to the valve member and threadably engaged to the internal thread. The valve shaft may be rotatable for traversing the valve member closer to or further away from the seat. The pin may be attached to the valve shaft and protrude radially outward from the valve shaft. The first adapter may be stationary with respect to the valve body. The first adapter may have a limit surface for limiting rotation of the valve shaft to limit maximum gas flow through the gas passageway.

The gas valve may further comprise a second adapter mounted to the valve body. The first adapter may be rotatably mounted to the second adapter for adjusting the maximum gas flow. The gas valve may further comprise a set screw threaded into a side of the second adapter and frictionally engageable to the first adapter for providing an option to fix an angular position of the first adapter with respect to the pin by frictionally engaging the set screw to the first adapter to limit the maximum gas flow or to allow free rotation of the first adapter within the second adapter by loosening the set screw so that the maximum gas flow is not limited by the limit surface.

The valve body may have an external thread. The valve may further comprise a front flange with internal threads threadably engageable to the external threads of the valve body. A distal end portion of the valve shaft may have a square configuration connectable to a gas valve handle.

The first adapter may have a protrusion defining the limit surface. The protrusion may further define an opposing surface positioned 180 degrees away from the limit surface.

A method of installing a presettable gas valve to a fireplace is also disclosed. The method may comprise the steps of connecting the presettable gas valve to a combustible gas source and to the fireplace, closing the presettable gas valve, positioning a limit surface of the first adapter an angular distance away from a pin attached to a shaft of the presettable gas valve, and fixing an angular position of the first adapter to set a maximum gas flow through the gas valve.

The method may further comprise the step of testing the maximum gas flow through the gas valve to determine whether the maximum gas flow is appropriate for the fireplace. The method may further comprise the step of repositioning the limit surface of the first adapter to readjust the maximum gas flow through the gas valve. The positioning step may comprise the step of rotating the first adapter within a second adapter. Also, the fixing step may comprise the step of tightening a set screw onto the first adapter.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 1 is an exploded perspective view of a presettable gas valve.

DETAILED DESCRIPTION

Referring now to the drawings, a presettable gas valve 10 is shown. During installation of the presettable gas valve 10, a maximum gas flow through the gas valve 10 can be increased or decreased by rotating and setting an angular position of a first adapter 12. The first adapter 12 blocks rotation of a pin 14 attached to a valve shaft 16 that opens and closes the gas valve 10. Limiting rotation of the pin 14 and the valve shaft 16 limits the maximum opening of the gas valve 10 and the gas flow through the gas valve 10. The angular position of the first adapter 12 can be set such that the first adapter 12 blocks rotation of the pin 14 and valve shaft 16 earlier or later to respectively decrease or increase the maximum gas flow through the valve.

Figure 3:
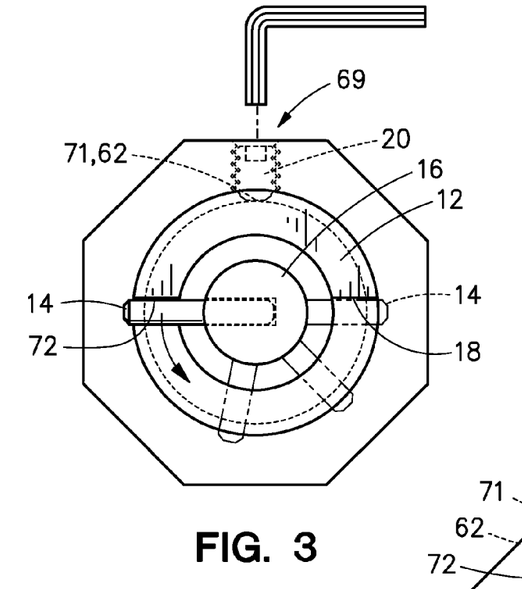
FIG. 3 is a cross sectional view of the gas valve shown in FIG. 2.
Figure 4:
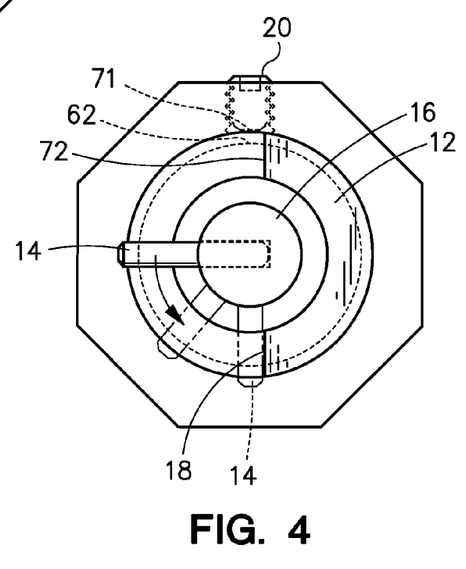
FIG. 4 is a cross sectional view of the gas valve shown in FIG. 2 with a first adapter rotated ninety degrees (90°) compared to the first adapter shown in FIG. 3.

By way of example and not limitation, the maximum rotation of the valve shaft 16 shown in FIG. 3 is one-hundred-eighty degrees (180°). To lower the maximum rotation of the valve shaft 16 and maximum gas flow through the presettable gas valve 10, a set screw 20 can be loosened (see FIG. 4), the first adapter 12 rotated in the clockwise direction (see FIG. 4) as desired then the set screw 20 can be tightened via an allen wrench 21 to fix the angular position of the first adapter 12. This blocks rotation of the pin 14 and the valve shaft 16 earlier. In FIGS. 3 and 4, the first adapter 12 is rotated ninety degrees (90°) in the clockwise direction. The pin 14 and the valve shaft 16 can now only be rotated ninety degrees (90°) in the counterclockwise direction. The first adapter 12 can be placed at any angular position to increase or decrease the maximum gas flow through the presettable gas valve 10 as needed or desired by the type of fireplace 22.

Alternatively, the set screw 20 may remain loose such that the gas valve 10 is capable of being fully opened. When the pin 14 contacts a limit surface 18 of the first adapter 12, the pin 14 pushes the first adapter 12 and further rotates the first adapter 12 in the counterclockwise direction when opening the gas valve 10. The first adapter 12 does not limit counterclockwise rotation of the valve shaft 16 and the pin 14. The valve shaft 16 can be rotated greater than 360 degrees.

Figure 2:
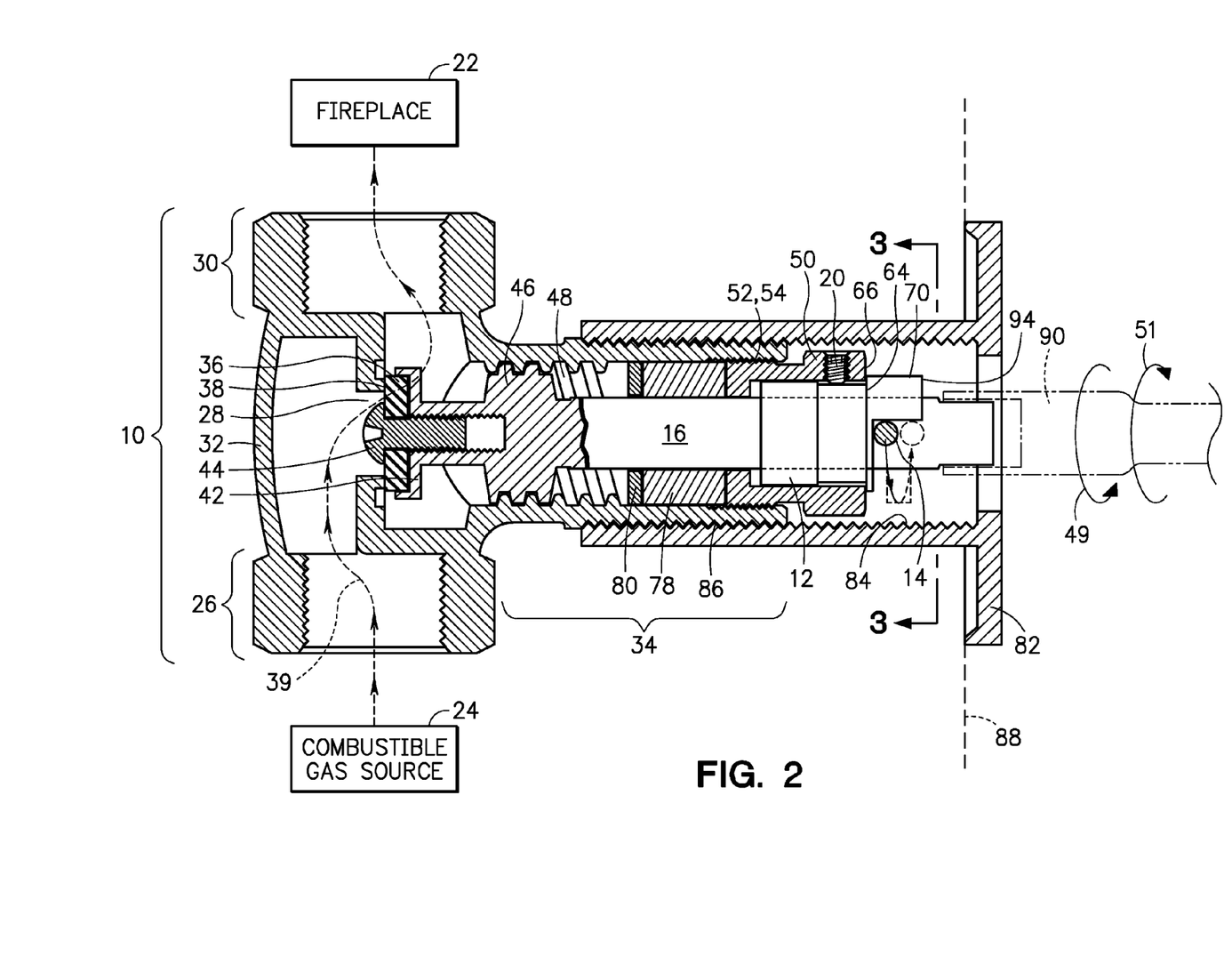
FIG. 2 is a cross sectional assembled view of the presettable gas valve shown in FIG. 1.

More particularly, referring now to FIG. 2, the gas valve 10 may be hooked up to a combustible gas source 24 (e.g., propane, natural gas, etc.) to provide additional heat to a fireplace 22 such as during initial ignition of a biomass/fuel within the fireplace 22 or continued illumination and heating in a fake fireplace 22. The combustible gas source 24 may be placed in fluid communication to an input port 26 of the gas valve 10. Gas is flowed from the combustible gas source 24 through the input port 26 and to a gas passageway 28. When the gas valve 10 is opened, the gas may flow through the gas passageway 28 and out of an output port 30 to the fireplace 22. The output port 30 may be connected to a log lighter such as a BLUE FLAME log lighter manufactured by BLUE FLAME. The log lighter may be placed under a fire grate for holding up the biomass/fuel or fake logs to assist in the initial ignition of the biomass/fuel or continued illumination and heating of the fake logs.

The gas valve 10 may comprise a valve body 32 which defines the input port 26, gas passageway 28 and the output port 30 as well as a stem portion 34. To open the gas valve 10 or allow gas to flow through the gas passageway 28, a valve member 36 is lifted off of a seat 38 that defines the gas passageway 28. The gas flows through the gas valve 10 as shown by the dash line 39 (see FIG. 2) when the valve member 36 is lifted off of the seat 38. The valve member 36 may be fabricated from a generally elastomeric material or other suitable material so as to be capable of forming an airtight seal with the seat 38 despite the pressure upstream of the gas passageway 28, namely, the side of the combustible gas source 24. When the valve member 36 is in contact and is pressed against the seat 38, the valve member 36 forms an airtight seal with the seat 38 to prevent the flow of gas through the gas passageway 28 of the gas valve 10.

To traverse the valve member 36 closer to and in contact with the seat 38 or further away from the seat 38, the valve member 36 may be mounted to the valve shaft 16. A distal end of the valve shaft 16 may have a platform 42 (see FIG. 2) for cradling and supporting the valve member 36. To retain the valve member 36 to the platform 42, the valve member 36 may have a through hole through which a screw 44 is inserted. The head of the screw 44 cinches the valve member 36 to the platform 42 and is threaded into the valve shaft 16. The valve shaft 16 may also have a threaded section 46 which can be threaded onto internal threads 48 of the stem portion 34 of the valve body 32. The threaded section 46 and the internal threads 48 may follow the right hand rule. When the valve shaft 16 is rotated in the counterclockwise direction 49 (see FIG. 2), the valve member 36 is traversed away from the seat 38 opening the valve 10. Conversely, when the valve shaft 16 is rotated in the clockwise direction 51 (see FIG. 2), then the valve member 36 is traversed toward the seat 38 closing the valve 10.

The first adapter 12 may be mounted to the valve body 32 with the assistance of a second adapter 50. The second adapter 50 may have external threads 52 which may be threaded onto a second internal thread 54 of the stem portion 34. The threaded section 46 may have coarser threads compared to the external threads 52 of the second adapter 50. As such, the stem portion 34 may have two different types of threads 48, 54 for receiving the threaded section 46 of the valve shaft 16 and the external threads 52 of the second adapter 50. It is also contemplated that the internal threads 48, 54 of the stem portion 34 may be identical. In this instance, the threaded section 46 and the external threads 52 of the second adapter 50 are also the same type of threads so as to be threadably engageable to the internal threads 48, 54 of the stem portion 34. The second adapter 50 may additionally have a wrenching surface 56 (see FIG. 1) for threadably engaging the external threads 52 of the second adapter 50 into the second internal threads 54 of the stem portion 34.

Figure 1:
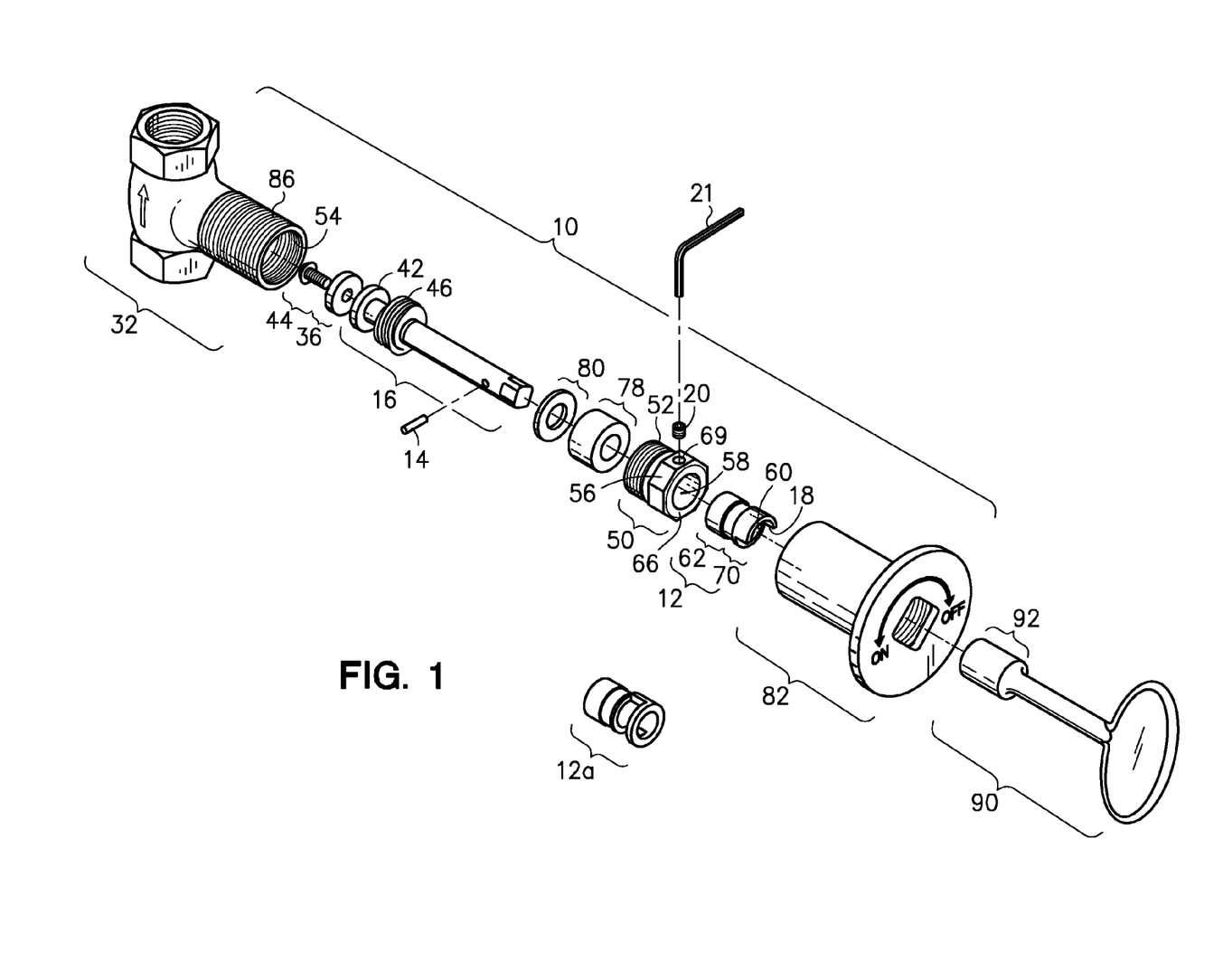

The second adapter 50 may be cinched onto the stem portion 34 to prevent rotation of the second adapter 50 during use. Alternatively, a thread locking material may be applied to the external threads 52 of the second adapter 50 and/or the internal threads 54 of the stem portion 34. After the second adapter 50 is threaded into the stem portion 34, the thread locking material is allowed to cure and secure the second adapter 50 to the stem portion 34. This prevents rotation of the second adapter 50 from the stem portion 34 during operation.

To assemble the gas valve 10, the valve shaft 16 is inserted through a central aperture 58 (see FIG. 1) of the second adapter 50. The second adapter 50 is threaded onto the internal threads 54 of the stem portion 34. The second adapter 50 is locked in place with a thread locking material and/or cinching the second adapter 50 onto the stem portion 34. With the second adapter 50 locked in place, the first adapter 12 is inserted into the central aperture 58 of the second adapter 50. The first adapter 12 may have a central aperture 60 (see FIG. 1) which receives the valve shaft 16. The pin 14 is now attached to the valve shaft 16 and rotatable between limit surface 18 and opposing surface 72 (see FIGS. 1 and 3-5). The first adapter 12 may have a base portion 62 that is received into the central aperture 58 of the second adapter 50. The first adapter 12 may additionally have a lip 64 (see FIG. 2) which contacts a proximal end 66 (see FIGS. 1 and 2) of the second adapter 50. This limits the insertion depth of the first adapter 12 into the second adapter 50.

Rotation of the first adapter 12 within the second adapter 50 can be limited by way of the set screw 20. In particular, the wrenching surface 56 (see FIG. 1) of the second adapter 50 may have a threaded hole 69 (see FIG. 1) for receiving the set screw 20. The set screw 20 may be threaded into the threaded hole 69 formed in the wrenching surface 56 until a distal end 71 (see FIG. 3) of the set screw 20 frictionally engages the base portion 62 (see FIG. 3) of the first adapter 12.

The first adapter 12 may have a protrusion 70 (see FIG. 1) that defines the limit surface 18 (see FIGS. 1 and 3-5). When the set screw 20 frictionally engages the base portion 62 of the first adapter 12, the first adapter 12 cannot rotate. The pin 14, which extends radially outward from the valve shaft 16, contacts the limit surface 18 of the protrusion 70 of the first adapter 12 when the valve shaft 16 is rotated in the counterclockwise direction. As discussed above, when the valve shaft 16 is rotated in the counterclockwise direction, the valve member 36 is traversed away from the seat 38. The pin 14 contacts the limit surface 18 of the protrusion 70 of the first adapter 12 and cannot be rotated beyond the angular position of the limit surface 18 since the set screw 20 prevents rotation of the first adapter 12. As such, rotation of the valve shaft 16 is limited and the amount of opening or gap created between the valve member 36 and the seat 38 is correspondingly limited when the pin 14 contacts the limit surface 18. The gas passageway 28 is opened to its maximum amount based on the preset limit of the first adapter 12. In the example shown in FIG. 3, the valve shaft 16 can be rotated by one-hundred-eighty degrees (180°) in the open or counterclockwise direction. Once the valve shaft 16 has been rotated one-hundred-eighty degrees (180°), the pin 14 contacts the limit surface 18. The valve shaft 16 stops rotating at this point. The gas valve 10 may now be closed after use by rotating the valve shaft 16 in the clockwise direction. When the valve shaft 16 is rotated one-hundred-eighty degrees (180°) in the clockwise direction, the valve member 36 contacts and presses against the seat 38 to close or shut off any gas flow through the valve 10. At this point, the pin 14 may be in contact with, barely touching or gapped away from an opposing surface 72 of the protrusion 70. In the example shown in FIG. 3, the valve shaft 16 can be rotated one-hundred-eighty degrees (180°) in the counterclockwise direction to open the valve 10. Contact of the pin 14 with the limit surface 18 limits the maximum amount of opening of the gas valve 10.

The maximum opening of the gas valve 10 can also be reduced by reducing the maximum rotation of the valve shaft 16 in the counterclockwise direction to less than one-hundred-eighty degrees (180°). In particular, the set screw 20 is loosened so as to frictionally disengage the set screw 20 from the base portion 62 of the first adapter 12, as shown in FIG. 4. The first adapter 12 is now rotatable within the second adapter 50. To reduce the amount of gas flow through the gas valve 10 by half, the first adapter 12 may be rotated in the clockwise direction ninety degrees (90°) as shown in FIG. 4. Also, the set screw 20 is now tightened. In this example, the valve shaft 16 may be rotated in the counterclockwise direction ninety degrees (90°). Adjustments can be made to limit the maximum opening of a gas passageway 28 by adjusting the angular position of the first adapter 12 in relation to the pin 14.

Figure 5:
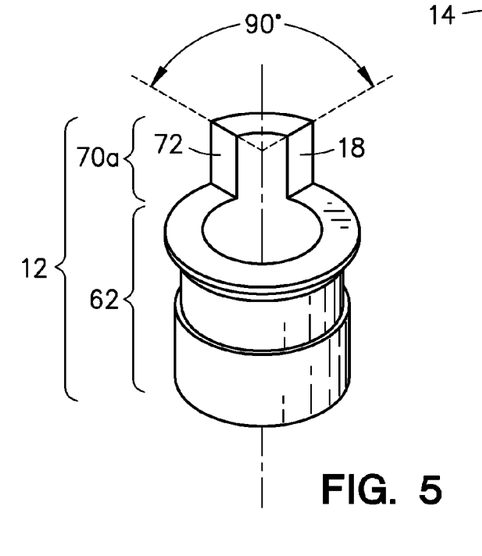
FIG. 5 is an alternate embodiment of the first adapter.

Alternative embodiments of the first adapter 12 are also contemplated. By way of example and not limitation, the angular distance between an opposing surface 72 of the protrusion 70a of the first adapter 12a may be ninety degrees (90°) away from the limit surface 18 as shown in FIG. 5. The total possible rotational angle of the valve shaft 16 is now two-hundred-seventy degrees (270°) instead of one-hundred-eighty degrees (180°). This allows the installer to have a wider adjustment range such that the maximum rotation of the valve shaft 16 can be limited from zero degrees (0°) to two-hundred-seventy degrees (270°). The angular distance between the opposing surface 72 of the protrusion 70 may be any degree away from the limit surface 18, specifically, twenty degrees (20°) to three-hundred-forty degrees (340°).

The gas valve 10 may additionally have a packing 78 and a washer plate 80. The packing 78 and washer plate 80 may be disposed within the stem portion 34 of the valve body 32 between the threaded section 46 of the valve shaft 16 and the second adapter 50. The packing 78 provides a generally airtight seal between the stem portion 34 and the valve shaft 16 such that gas does not escape through the stem portion 34 when the gas valve 10 is open and gas is flowing through the gas passageway 28.

After the angular position of the first adapter 12 is set, a front flange 82 having internal threads 84 may be threaded over external threads 86 of the stem portion 34 of the valve body 32. The front flange 82 covers a hole formed in wall 88 next to the fireplace 22.

To install the gas valve 10, the valve body 32 is connected to a combustible gas source 24. The valve body 32 is disposed behind the wall 88 with its stem portion 34 aligned to an opening formed in the wall 88 such that a valve handle 90 may engage the valve shaft 16 to rotate the same and open and close the gas valve 10. Initially, the front flange 82 is removed from the stem portion 34 of the valve body 32. The set screw 20 is loosened such that the first adapter 12 can freely rotate within the second adapter 50. The valve shaft 16 is then rotated in the clockwise direction such that the valve member 36 is seated onto the seat 38 and the gas valve 10 is now closed. At this point, the first adapter 12 is rotated until the limit surface 18 of the first adapter 12 is at a desired angle away from the pin 14. By way of example and not limitation, for fake fireplaces, the gas passageway 28 can be opened to a greater extent compared to real biomass/log burning fireplaces 22. When the gas valve 10 is installed to a fake fireplace, the limit surface 18 of the first adapter 12 may be set one-hundred-eighty degrees (180°) away from the pin 14. In contrast, for real biomass/log burning fireplaces 22, the limit surface 18 may be set ninety degrees (90°) away from the pin 14. This will allow more combustible gas to flow through the gas valve 10 for fake fireplaces 22 and less gas to flow through the gas valve 10 for real biomass/log burning fireplaces 22. Once the first adapter 12 and its angular position is set such that the limit surface 18 is the appropriate angular distance away from the pin 14, the set screw 20 is retightened such that the distal end of the set screw 20 frictionally engages the base portion 62 of the first adapter 12 and locks the position of the first adapter 12. The installer may test the gas valve 10 to ensure that the correct amount of gas is flowing through the gas valve 10 when the gas passageway 28 is opened to its maximum extent. To increase or decrease the maximum opening of the gas passageway 28, the set screw 20 is loosened, the first adapter 12 is rotated within the second adapter 50 in the appropriate direction, then the set screw 20 is retightened to lock the first adapter 12 to the second adapter 50. Once the maximum opening of the gas passageway 28 is set appropriately, the front flange is inserted through the hole of the wall 88 and threaded onto the stem portion 34. During normal operation, a user may insert the handle 90 through the front flange 82. A distal end portion 92 of the handle 90 may have a square cavity for receiving a square shaped distal end portion of the valve shaft 16. In this manner, the handle 90 may be used to rotate the valve shaft 16 clockwise as well as counterclockwise to open and close the gas valve 10.

The gas valve 10 disclosed herein is set such that the maximum gas flow through the gas valve 10 provides the appropriate amount of gas flow to the fireplace 22. No adjustments are necessary after installation. The user need only open the gas valve 10 to its maximum opening and the appropriate amount of gas flow is provided to the fireplace 22. As such, an excessive amount of gas is not provided to the fireplace 22 and the fireplace 22 may be efficiently operated.

The installer of the gas valve 10 may have at least two different options. The installer can set the maximum gas flow through the gas valve 10 by tightening the set screw 20. When the pin 14 contacts the limit surface 18, the pin 14 and the valve shaft 16 cannot rotate any further. The angular position of the first adapter 12 can be set by the installer to control and set the maximum gas flow as desired or needed by the fireplace. Alternatively, the installer can loosen the set screw 20. When the pin 14 contacts the limit surface 18 of the first adapter 12, the pin rotates the first adapter 12. The first adapter and the limit surface 18 does not stop rotation of the pin 14 and the valve shaft 16. The fireplace user manually adjusts the opening of the gas valve 10 to control the amount of gas is provided to the fireplace.

In the event that the installer loosens the set screw 20, the pin 14 is axially displayed as the shaft 16 is rotated to open and close the gas passageway 28. Unfortunately, when the set screw 20 is loosened, the first adapter 12 can wiggle axially along the valve shaft 16. In certain instances, when turning the shaft 16 to close the gas passageway 28, the pin 14 may accidently hit the distal end 94 (see FIG. 2) of the protrusion 70. The reason is that the first adapter 12 may be at the left side of the gas valve 10 (see FIG. 2) while the pin 14 when the gas passageway 28 is opened is disposed at the right side of the valve 10. As the valve shaft 16 is rotated in the counterclockwise direction 51 to close the gas passageway 28, the pin 14 may get stuck on the distal end 94 of the protrusion 70. To mitigate against such risk, the protrusion 70 may be made longer to allow for the wiggle room of the first adapter 12 within the aperture 58 of the second adapter 50. Alternatively, the first adapter 12 may be fabricated with a slotted hole 96 that traps the pin 14 so that the pin 14 cannot get stuck on the distal end 94 of the protrusion 70. When the set screw 20 is loosened so that the first adapter 12 can slide along the axial length of the valve shaft 16, the pin 14 is trapped within the slotted hole 96.

Figure 6:
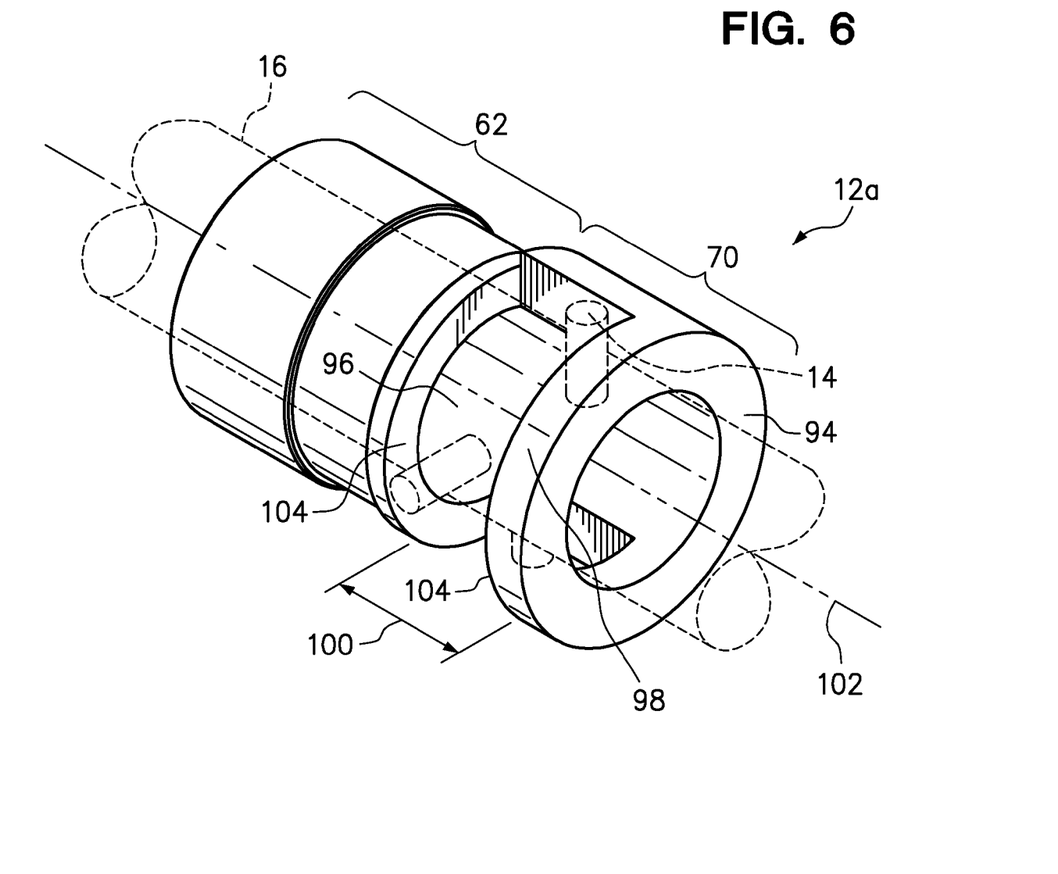
FIG. 6 is a perspective view of an alternative embodiment of the first adapter.

Referring now to FIG. 6, an enlarged view of the first adapter 12a is shown. The first adapter 12a may have a retaining structure 98 that extends from the protrusion 70. The base portion 62 along with the retaining structure 98 defines the slotted hole 96. A width 100 of the slotted hole 96 may be sufficient so that when the set screw 20 is tightened onto the first adapter 12, the pin 14 can travel axially along axis 102 without being limited by the interior surfaces 104 of the slotted hole 96. When the set screw 20 is loosened, the wiggle room of the first adapter 12 within the aperture 58 of the second adapter 50 is limited by the pin 14.

The above description is given by way of example, and not limitation. Given the above disclosure, one skilled in the art could devise variations that are within the scope and spirit of the invention disclosed herein, including various ways of attaching the front flange 82 to the stem portion 34 of the valve body 32. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A gas valve for regulating gas supplied to a fireplace, the valve comprising:
   a valve body having an input port connectable to a gas source, an output port for supplying combustible gas to the fireplace, a stem portion with an internal thread, and a seat defining a gas passageway disposed between the input port and the output port so that the gas flowing into the valve from the input port flows out of the valve through the output port by way of the gas passageway;
   a valve member selectively traversable closer to or further away from the seat for regulating gas flowing through the gas passageway;
   a valve shaft attached to the valve member and threadably engaged to the internal thread, the valve shaft being rotatable for transversing the valve member closer to or further away from the seat;
   a pin attached to the valve shaft protruding radially outward from the valve shaft;
   a first adapter stationary with respect to the valve body, the adapter having a limit surface for limiting rotation of the valve shaft to limit maximum gas flow through the gas passageway;
   a second adapter mounted to the valve body, the first adapter rotatably mounted to the second adapter for adjusting the maximum gas flow;
   a set screw threaded into a side of the second adapter and frictionally engageable to the first adapter for providing an option to fix an angular position of the first adapter with respect to the pin by frictionally engaging the set screw to the first adapter to limit the maximum gas flow or to allow free rotation of the first adapter within the second adapter by loosening the set screw so that the maximum gas flow is not limited by the limit surface.

2. The gas valve of claim 1 wherein the valve body has an external thread, and the valve further comprises a front flange with internal threads threadably engageable to the external threads of the valve body.

3. The gas valve of claim 1 wherein a distal end portion of the valve shaft has to square configuration connectable to a gas valve handle.

4. The gas valve of claim 1 wherein the first adapter has a protrusion defining the limit surface, the protrusion further defining an opposing surface positioned 180 degrees away from the limit surface.

5. A method of installing a presettable gas valve to a fireplace, the method comprising the steps of:
   connecting the presettable gas valve to a combustible gas source and to the fireplace;
   closing the presettable gas valve;
   positioning a limit surface of the first adapter an angular distance away from a pin attached to a shaft of the presettable gas valve wherein the positioning step comprises the step of rotating the first adapter within a second adapter;

fixing an angular position of the first adapter to set a maximum gas flow through the gas valve wherein the fixing step comprises the step of tightening a set screw onto the first adapter.

6. The method of claim 5 further comprising the step of testing the maximum gas flow through the gas valve to determine whether the maximum gas flow is appropriate for the fireplace.

7. The method of claim 6 further comprising the step of repositioning the limit surface of the first adapter to readjust the maximum gas flow through the gas valve.

8. A gas valve for regulating gas supplied to a fireplace, the valve comprising:
a valve body having an input port connectable to a gas source, an output port for supplying combustible gas to the fireplace, a stem portion with an internal thread, and a seat defining a gas passageway disposed between the input port and the output port so that gas flowing into the valve from the input port flows out of the valve through the output port by way of the gas passageway;
a valve member selectively traversable closer to or further away from the seat for regulating gas flow through the gas passageway;
a valve shaft attached to the valve member and threadable engaged to the internal thread, the valve shaft being rotatable for traversing the valve member closer to or further away from the seat;
a pin attached to the valve shaft protruding radially outward from the valve shaft;
a first adapter having a slotted hole with the pin retained therein, the first adapter being fixable with respect to the valve body for limiting rotation of the valve shaft to limit maximum gas flow through the gas passageway or moveable with respect to the valve body for allowing the user to adjust maximum gas flow;
wherein the pin is retained within the slotted hole when the first adapter is movable with respect to the valve body to mitigate jams when the valve shaft is rotated to traverse the valve member closer to the seat;
a second adapter mounted to the valve body, the first adapter rotatably mounted to the second adapter for adjusting the maximum gas flow;
a set screw threaded into a side of the second adapter and frictionally engageable to the first adapter for providing an option to fix an angular position of the first adapter with respect to the pin by frictionally engaging the set screw to the first adapter to limit the maximum gas flow or to allow free rotation of the first adapter within the second adapter by loosening the set screw so that the maximum gas flow is not limited by the limit surface.

9. The gas valve of claim 8 wherein the valve body has an external thread, and the valve further comprises a front flange with internal threads threadably engageable to the external threads of the valve body.

10. The gas valve of claim 8 wherein a distal end portion of the valve shaft has a square configuration connectable to a gas valve handle.

11. The gas valve of claim 8 wherein the first adapter has a protrusion defining the limit surface, the protrusion further defining an opposing surface positioned 180 degrees away from the limit surface.

12. A method of installing a presettable gas valve to a fireplace, the method comprising the steps of:
connecting the presettable gas valve to a combustible gas source and to the fireplace;
closing the presettable gas valve;
disposing a pin attached to a shaft within a slotted hole of a first adapter;
positioning a limit surface of the first adapter an angular distance away from the pin attached to the shaft of the presettable gas valve wherein the positioning step comprises the step of rotating the first adapter within a second adapter;
fixing an angular position of the first adapter to set a maximum gas flow through the gas valve or loosening the first adapter so that the maximum gas flow through the gas valve is sellable during use wherein the fixing step comprises the step of tightening a set screw onto the first adapter.

13. The method of claim 12 further comprising the step of testing the maximum gas flow through the gas valve to determine whether the maximum gas flow is appropriate for the fireplace.

14. The method of claim 13 further comprising the step of repositioning the limit surface of the first adaptor to readjust the maximum gas flow through the gas valve.

* * * * *